United States Patent [19]

Emmons et al.

[11] 4,180,645

[45] Dec. 25, 1979

[54] POLYURETHANE COATING COMPOSITIONS FROM DICYCLOPENTENYL ACRYLATE AND/OR METHACRYLATE

[75] Inventors: William D. Emmons, Huntingdon Valley; Kayson Nyi, Sellersville; Peter R. Sperry, Doylestown, all of Pa.

[73] Assignee: Rohm and Haas Company, Philadelphia, Pa.

[21] Appl. No.: 908,426

[22] Filed: May 22, 1978

[51] Int. Cl.$^2$ .................. C08G 18/30; C08G 18/22; C08L 27/00; C08L 75/04
[52] U.S. Cl. .................. 528/73; 260/22TN; 260/23 TN; 528/74; 528/75; 528/55; 528/56; 525/123
[58] Field of Search .................. 528/75, 73, 74; 260/22 TN, 23 TN, 873, 859, 901

[56] References Cited

U.S. PATENT DOCUMENTS

| | | | |
|---|---|---|---|
| 2,503,209 | 4/1950 | Nyquist et al. | 260/77.5 CR |
| 2,879,248 | 3/1959 | Nischk et al. | 260/859 R |
| 3,008,917 | 11/1961 | Park et al. | 260/859 R |
| 3,396,210 | 8/1968 | McKillip | 260/859 R |
| 3,642,750 | 2/1972 | Wegemund et al. | 526/283 |
| 3,644,569 | 2/1972 | Pietsch et al. | 260/859 R |
| 3,694,389 | 9/1972 | Levy | 260/23 TN |

FOREIGN PATENT DOCUMENTS

| | | | |
|---|---|---|---|
| 1492502 | 10/1969 | Fed. Rep. of Germany. | |
| 2256189 | 7/1975 | France | 260/77.5 AP |
| 794585 | 5/1958 | United Kingdom. | |

*Primary Examiner*—H. S. Cockeram
*Attorney, Agent, or Firm*—Lester E. Johnson

[57] ABSTRACT

This invention is concerned with autoxidizable coating compositions which contain
(a) a member selected from the group consisting of an organic polyisocyanate, a urethane oil, and a uralkyd;
(b) at least one non-volatile reactive liquid monomer selected from the group consisting of dicyclopentenyl acrylate and dicyclopentenyl methacrylate; and
(c) an effective amount of a polyvalent metal-containing complex or salt that catalyzes the curing of (a) and (b).

Use of the non-volatile reactive liquid component enables the production of coating compositions having high application solids content and yet having suitable viscosity for efficient handling. The coatings obtained from the compositions of the present invention combine the typical desirable properties including durability, weather-resistance, etc. of polyurethane coatings and often with unexpected enhancement of the quality of the coatings, such as in respect to toughness, while providing such compositions having higher solids content to facilitate the coating operations therewith.

12 Claims, No Drawings

POLYURETHANE COATING COMPOSITIONS FROM DICYCLOPENTENYL ACRYLATE AND/OR METHACRYLATE

CROSS-REFERENCES

This application is related to the commonly-assigned applications identified as follows: Ser. No. 664,596, filed Mar. 8, 1976, now-abandoned; Ser. No. 664,597, filed Mar. 8, 1976, now-abandoned in favor of a continuation-in-part thereof, Ser. No. 851,325, filed Nov. 4, 1977, now U.S. Pat. No. 4,131,580, issued Dec. 26, 1978; Ser. No. 665,017, filed Mar. 8, 1976, now U.S. Pat. No. 4,071,489, issued Jan. 31, 1978; Ser. No. 687,856, filed May 19, 1976, now-abandoned in favor of Ser. No. 968,706, filed Dec. 12, 1978, a continuation-in-part of the foregoing, and a continuation application of Ser. No. 687,856 filed Jan. 13, 1979; Ser. No. 699,726, filed June 24, 1976, now-abandoned in favor of a continuation-in-part thereof, Ser. No. 802,087, filed May 31, 1977, now U.S. Pat. No. 4,100,133, issued July 11, 1978; Ser. No. 687,067, filed May 17, 1976, now-abandoned in favor of continuation-in-part thereof, Ser. No. 860,664, filed Dec. 15, 1977, now-allowed; Ser. No. 703,348, filed July 7, 1976, now U.S. Pat. No. 4,097,677 issued June 27, 1978, and continuation-in-part applications thereof, Ser. Nos. 782,129, filed Mar. 28, 1977, now-allowed, 806,572, filed June 14, 1977, now allowed, 908,427, filed May 22, 1978, now-pending, and 908,415, filed May 22, 1978, now-pending; and Ser. No. 823,809, filed Aug. 11, 1977, now U.S. Pat. No. 4,140,724, issued Feb. 20, 1979.

DESCRIPTION OF THE INVENTION

Various coating compositions using polyisocyanate functionality to produce polyurea or polyurethane products are known. Examples of such compositions are the isocyanate-modified alkyd resins, sometimes referred to as "uralkyds" and the isocyanate-modified drying oils, commonly referred to as "urethane oils," which cure with a drier or siccative in the presence of the oxygen in air, and isocyanate-terminated prepolymers, which cure in the presence of the moisture in ordinary ambient air. Besides these important types of single-component systems, there are several important modifications of the isocyanate-terminated prepolymer, especially those in which there is included, shortly before use of the composition, a resin-forming polymer or condensate containing active hydrogen, as in amino or hydroxyl groups, and/or a catalyst (e.g., an organotin salt) to accelerate the cure, either of the moisture-curable single-component systems above or the systems in which an additional resin-forming component having active hydrogen is used. The most important known polyurethane coating compositions (and their preparation) with which the present invention is concerned are described and discussed quite extensively in Chapter X. Coatings, pp. 453–607, and especially pp. 456–601 in J. H. Saunders and K. C. Frisch, Polyurethanes: Chemistry and Technology, Part, II, Interscience Publishers, (N.Y., 1964).

In accordance with the present invention, it has been found that the monomeric liquids dicyclopentenyl acrylate (DCPA), dicyclopentenyl methacrylate (DCPMA), and mixtures thereof have outstanding compatibility with organic polyisocyanates, also with prepolymers thereof with polyhydroxy or polyamine compounds, and also with reaction products of polyisocyanates with other organic compounds, such as alkyds and drying oils, e.g., the "uralkyds" and "urethane oils" above. It has also been found that these high-boiling, non-volatile liquids—DCPA and DCPMA—are useful in the isocyanate-type of coating compositions to control the viscosity with relatively little or no additional organic solvent of volatile character. Since these monomeric liquids, DCPA and DCPMA, when combined with a member of the group of polyvalent metal-containing complex or salt which is known in the art as a drier or siccative, are reactive and are combined in the final coating films to provide good properties therein, they provide a mechanism by which the coating composition can be adjusted in viscosity to make it suitable for application in various ways, as by spraying, brushing, etc. with or without the auxiliary use of limited amounts of volatile solvent. The reduced volatile solvent improves the environmental aspect of preparing and using the coating compositions while the combining of these monomeric materials in the film with other reactive components results in enhancement of the film properties without detriment to the qualities normally desired and attained with the polyurethane type of coating composition.

The liquid monomers referred to hereinafter as DCPA and DCPMA respectively, are hereinafter referred to generically by the expression DCP(M)A and are believed to have the structure represented by the following formula:

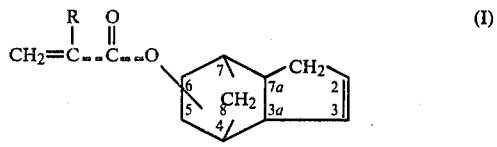

wherein R is H or $CH_3$. The (meth)acryloxy substituent may be on either the 5 or 6 position, the commercial product being a mixture of the two isomers.

Generally, the invention contemplates coating compositions comprising:
(a) a member selected from the group consisting of an organic polyisocyanate, a urethane oil, and a uralkyd;
(b) at least one non-volatile reactive liquid monomer selected from the group consisting of dicyclopentenyl acrylate and dicyclopentenyl methacrylate; and
(c) an effective amount of a polyvalent metal-containing complex or salt that catalyzes the curing of (a) and (b) hereinafter.

In another aspect, the invention contemplates coating compositions comprising the components (a), (b) and (c) mentioned above, further comprising
(d) a member selected from the group consisting of (i) an organic compound having a plurality of groups containing a reactive hydrogen atom as defined by the method described in Kohler et al., J. Am. Chem. Soc., 40, 2181–8 (1927), and (ii) an organic compound having a plurality of oxazolidine groups that are moisture-activated to a condition containing a reactive hydrogen atom;

The non-volatile liquid monomer may consist of one or more of DCPA or DCPMA, or it may consist of a mixture of non-volatile reactive liquid monomeric materials consisting of a predominant proportion therein of one or more of DCPA or DCPMA and a minor proportion of at least one non-volatile liquid ester of a higher ($C_{10}$–$C_{20}$) aliphatic alcohol with acrylic or methacrylic acid or a di($C_4$–$C_8$) alkyl fumarate, maleate, or itaconate. Such aliphatic esters include decyl acrylate, isodecyl acrylate, undecyl acrylate, lauryl acrylate, cetyl acrylate, pentadecyl acrylate, hexadecyl acrylate and octadecyl acrylate, as well as the corresponding methacrylates and the unsaturated analogues such as oleyl acrylate or methacrylate, linoleyl (meth)acrylate, linolenyl (meth)acrylate, etc. and the dialkyl esters include dibutyl, dipentyl, dihexyl, dioctyl, and di-(2-ethylhexyl)maleates, fumarates and itaconates. The use of the latter monomer(s) in conjunction with the required monomers of, DCPA or DCPMA, enables the operator or user to vary widely the properties in the cured films, such as hardness, toughness, and flexibility. At the same time the use of the mixture of non-volatile monomers facilitates the adjustment of viscosity of the composition to adapt it for application by various methods such as, for example, spraying, brushing, roll-coating, etc.

Thus, the non-volatile reactive monomer component may comprise, besides at least one of DCPA and DCPMA, up to 49% by weight of the long-chain aliphatic acid (meth)acrylate. This component of the composition may serve as the entire vehicle so that essentially no volatile solvent component is employed, thereby obtaining a composition that may be considered to be 100% solids in that all components serve to develop the solid resinous mass upon oxidation, condensation, and polymerization resulting from the inclusion of a drier or siccative. Whereas the most advantageous compositions from the standpoint of control of pollution, minimization of the risks of flammability and toxicity to personnel employing the compositions are those of 100% solids characteristic, nevertheless, the invention also contemplates compositions wherein an amount of volatile solvent may be employed in conjunction with the liquid monomeric component above described, the proportion of volatile solvent being not over about 50% by weight of the total weight of the formulated coating composition that is to be applied. A drier is added, preferably just before application. The compositions may also contain other catalysts, volatile solvents, pigments, fillers, stabilizers to extend pot-life, and optionally additional ethylenically unsaturated monomers, such as polyethylenically unsaturated monomer having at least two groups of the formula $H_2C=C<$. These monomers when used in small amounts, such as up to 25% by weight, based on total binder weight, improve water-resistance, solvent-resistance, abrasion-resistance, blocking-resistance, and the like. Examples include glycol or polyol (meth)acrylates, e.g., ethylene glycol di(meth)acrylates, trimethylolpropane trimethacrylate, neopentyl glycol di(meth)acrylate; 1,6-hexanediol di(meth)acrylate; pentaerythritol tri- and tetra-(meth)acrylate; 1,3- and 1,4-butanediol di(meth)acrylate.

A wide variety of polyisocyanate, that is isocyanates having at least two —NCO groups, can be used in the compositions of the invention and substantially any isocyanate having two or more —NCO groups which will react with an active hydrogen atom in an organic compound in the presence of moisture can be used. The isocyanates which are used in the compositions of the invention are well known in the art.

Among the polyisocyanates which can be used in the compositions of the invention are aliphatic isocyanates such as 1,6-hexamethylene diisocyanate, 1,8-octamethylene, diisocyanate, 1,12-dodecamethylene diisocyanate, 2,2,4-trimethylhexamethylene diisocyanate, and similar alkylene diisocyanates, 3,3'-diisocyanatodipropyl ether, 3-isocyanatomethyl-3,5,5-trimethylcyclohexylisocyanate, cyclopentylene-1,3-diisocyanate, cyclohexylene-1,4-diisocyanate, methyl 2,6-diisocyanatocaproate, and related isocyanates, bis-(2-isocyanatoethyl)-fumarate, 4-methyl-1,3-diisocyanatocyclohexane, trans-vinylene diisocyanate and similar unsaturated isocyanates, 4,4'-methylene-bis(isocyanatocyclohexane), and related isocyanates, menthane diisocyanate, N,N',N''-tris-(6-isocyanatohexamethylene)-biuret, and related isocyanates, bis-(2-isocyanatoethyl)-carbonate, and similar carbonate diisocyanates, as well as other known isocyanates derived from aliphatic polyamines, aromatic isocyanates such as tolylene diisocyanates, xylylene diisocyanates, dianisidine diisocyanate, 4,4'-diphenylmethane diisocyanate, 1-ethoxy-2,4-diisocyanatobenzene, 1-chloro-2,4-diisocyanatobenzene, tris-(4-isocyanatophenyl)methane, naphthalene diisocyanates, fluorene diisocyanates, 4,4'-biphenyl diisocyanate, phenylene diisocyanates, 3,3'-dimethyl-4,4'-diphenyl diisocyanate, p-isocyanatobenzyl isocyanate, tetrachloro-1,3-phenylene diisocyanate, and related isocyanates, 2,4,6-tribromo-1,3-phenylene diisocyanate, bis-(2-isocyanatoethyl)benzene, the diisocyanate derived from "dimer acid" of various grades obtained from the polymerization of linoleic acid (see U.S. Pat. No. 2,482,761), vinyl polymers containing units derived from isocyanatoethyl methacrylate as a monomer or comonomer, prepolymers of multiple isocyanate compounds with polyhydroxyl or polyamino compounds, such as, prepolymers of 3-isocyanatomethyl-3,3,5-trimethylcyclohexylisocyanate, tolylene diisocyanate, menthane diisocyanate, 4,4'-methylene-bis-(cyclohexylisocyanate), 4,4'-methylene-bis-(isocyanocyclohexane), 2-isocyanatoethyl-6-isocyanatocaproate, and the like with polyether polyols, polyester polyols, and the like.

The preparation of the isocyanate prepolymers useful in the compositions of the invention is well known in the art. Generally the preparation of these prepolymers involves the reaction of a polyol, polyether, hydroxyl-terminated polyester, polyester amide, or other polyfunctional active hydrogen compound, with a diisocyanate or other polyisocyanate, using an excess of the isocyanate to yield an isocyanate-terminated prepolymer product. An extensive description of some of the useful techniques for preparing the isocyanate prepolymers can be found in J. H. Saunders and K. C. Frisch, Polyurethanes: Chemistry and Technology, Part II, Interscience Publishers (New York, 1964), especially on pages 8 to 49, and in the various references cited by Saunders and Frisch. Other preparative techniques which are known in the art can also be employed.

Other polyfunctional isocyanates which are useful in the compositions of the invention are disclosed in U.S. Pat. No. 3,162,664, of Brotherton et al., granted Dec. 22, 1964, U.S. Pat. No. 3,427,346, of Brotherton et al., granted Feb. 11, 1969, U.S. Pat. No. 3,275,679, of Brotherton et al., granted Sept. 27, 1966, U.S. Pat. No. 3,352,830, of Schmitt et al., granted Nov. 11, 1967, U.S. Pat. No. 2,729,666 of Stallmann, granted Jan. 3, 1956, U.S. Pat. No. 2,768,154 of Unruh et al., granted Oct. 23, 1956, U.S. Pat. No. 3,267,122 of Lehmann et al., granted Aug. 16, 1966, U.S. Pat. No. 3,281,378, of Garber et al., granted Oct. 25, 1966, U.S. Pat. No. 3,124,605, of Wagner, granted Mar. 10, 1964, U.S. Pat. No. 2,718,516, of Bortnick, granted Sept. 20, 1955, as well as isocyanates prepared from the amines disclosed in U.S. Pat. No. 3,256,318, of Brotherton et al., granted June 14, 1966. Other isocyanates, such as those containing silicone and phosphorus can also be used in making the compositions of the invention.

An especially useful class of aliphatic polyisocyanate compounds are the ester isocyanates represented by the formulas

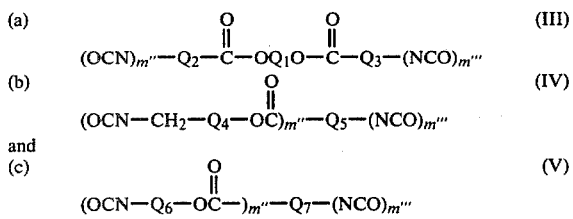

wherein $m''$ and $m'''$ are either one or two; $Q_1$ is the diester residue of an alkane or cycloalkane diol having two primary hydroxyl groups, preferably from 2 to 18 carbon atoms, and up to one hetero oxygen or sulfur atom; $Q_2$ and $Q_3$ are divalent alkylene radicals, preferably having 1 to 18 carbon atoms; $Q_4$ is an alkylene radical, preferably having 1 to 7 carbon atoms, and up to one hetero oxygen or sulfur atom; $Q_5$ is a divalent arylene or aralkylene radical, preferably having 6 to 18 carbon atoms; $Q_6$ is an alkylene radical, preferably having 2 to 8 carbon atoms, and up to one hetero oxygen or sulfur atom; and $Q_7$ is a divalent alkylene radical, preferably having 1 to 18 carbon atoms. As used herein, the term "alkylene" also includes "cycloalkylene."

Preferably, the polyisocyanate compound is an isocyanate-terminated prepolymer of the type described in Saunders-Frisch supra.

The organic compound having a plurality of groups containing a reactive hydrogen atom can be a polyester, polyamide, or polyesteramide having terminal groups containing a reactive hydrogen atom, such as OH, $NH_2$, NH and CONH, obtained by the condensation of:

I. Glycols (or other polyols) and dibasic acids;
II. Amino alcohols and dibasic acids;
III. Glycols, diamines and dibasic acids;
IV. Glycols, amino alcohols and dibasic acids;
V. Amino alcohols, diamines and dibasic acids;
VI. Amino acids, glycols and dibasic acids;
VII. Amino acids, amino alcohols and dibasic acids;
VIII. Amino alcohols, dibasic acids and hydroxycarboxylic; and acids
IX. Diamines and dibasic acids.

It is advantageous to use a small excess of the alcoholic hydroxyl-containing constituent in preparing the polymers.

Examples of polyols include triols such as trimethylol methane and erylthritol; and diols such as ethylene glycol, propylene glycol, diethylene glycol, trimethylene glycol, pentamethylene glycol, hexamethylene glycol, decamethylene glycol, dodecamethylene glycol, 1,12-octadecanediol and pentaglycol.

Examples of dibasic carboxylic acids are malonic, succinic, glutaric, adipic, β-methyladipic, pimelic, suberic, azelaic, sebacic, undecanedioic, brassylic, isophthalic, hexahydroterephthalic, p-phenylene-diacetic and acetone-dicarboxylic acid.

Any amino alcohol having at least one hydrogen atom attached to the amino nitrogen atom may be employed including aromatic amino alcohols, e.g., p-hydroxymethylbenzylamine, 4-hydroxymethyl-4-amino-methyldiphenyl and p-aminophenylethyl alcohols; aliphatic amino alcohols, e.g., 5-aminopentanol-1:6-amino-5-methylhexanol-1,4(p-aminophenyl)cyclohexanol, hydroxyethoxyethoxyethyl-amine, and N-(β-aminoethyl)-N-(ω-hydroxy-hexyl)-aniline.

The preferred amino alcohols are of formula $$HO—R—NH_2$$

where R represents saturated divalent hydrocarbon radicals with a chain length of at least two carbon atoms. Amino alcohols which fall within this group include ethanolamine, 3-aminopropanol, 4-aminobutanol; 6-aminohexanol, and 10-aminodecanol.

Any diamine may be employed, which contains at least one hydrogen atom attached to each amino nitrogen atom. The preferred diamines are of formula $NH_2RNH_2$ where R represents saturated divalent hydrocarbon radicals with a chain length of at least two carbon atoms, e.g., ethylenediamine, hexamethylenediamine, 3-methylhexamethylenediamine, and decamethylenediamine. However, aromatic diamines such as m-phenylenediamine may also be used.

Any polymerizable monohydroxy-monocarboxylic acid or ester-forming derivative thereof may be employed. The preferred hydroxy-acids are of formula HO—R—COOH where R represents saturated divalent hydrocarbon radicals, e.g., 6-hydroxycaproic, 10-hydroxydecanoic, and 12-hydroxystearic acid.

Any polymerizable monoamino-monocarboxylic acid or ester-forming derivative thereof may be employed including 6-aminocaproic, 9-aminononanoic, and 11-aminoundecanoic, and 12-aminostearic acids, caprolactam, etc.

Also useful as the reactive hydrogen atom-containing organic compound is a hydroxyl-terminated polyester, such as an alkyd resin having a molecular weight in the range of about 4000 to 12,000 obtained from the condensation of a (1) polyol having at least 2 hydroxyl groups and from 2 to 6 carbon atoms, such as ethylene glycol, propylene glycol, trimethylene glycol, glycerol, diethylene glycol, erythritol, and pentaerythritol or mixtures thereof, with (2) a ($C_4$–$C_{12}$) aliphatic or aromatic dicarboxylic acid, such as adipic, pimelic, azelaic, sebacic, glutaric, and phthalic anhydride, or mixtures thereof, and optionally with (3) a long-chain ($C_6$–$C_{20}$) saturated or unsaturated fatty acid or an ester thereof, such as a glyceride, especially the drying or semidrying types.

Another type of material useful as a reactive hydrogen atom-containing organic compound is an addition polymer of one or more monomers having groups containing reactive hydrogen atoms, such as hydroxyl or amino groups. For example, polymers of hydroxyl-containing monoethylenically unsaturated monomers, such as hydroxyethyl acrylate or methacrylate, 2-hydroxypropyl (meth)acrylate, and 3-hydroxypropyl (meth)acrylate, or copolymers thereof with other monoethylenically unsaturated monomers having a terminal group $H_2C=C$, such as styrene, vinyltoluene, vinyl acetate, acrylonitrile, acrylamide, methacrylamide, ($C_1$–$C_{18}$) alkyl esters of acrylic or methacrylic acid, e.g., methyl acrylate, methyl methacrylate, ethyl acrylate, ethyl methacrylate, butyl acrylate or methacrylate, hexyl acrylate or methacrylate, 2-ethylhexyl (meth)acrylate, lauryl (meth)acrylate, pentadecyl (meth)acrylate, and octadecyl (meth)acrylate.

Likewise useful as reactive hydrogen atom-containing organic compounds are vinyl addition polymers, especially copolymers of amine-containing monoethylenically unsaturated monomers, such as aminoethyl vinyl ether, aminoethyl vinyl sulfide, 2-aminoethyl acrylate or methacrylate and the corresponding 2-(monoalkyl)aminoethyl (meth)acrylate. The copolymers may contain any one of or plurality of the monoethylenically unsaturated monomers having a terminal group, $H_2C{=}C{<}$, such as those mentioned in the preceding paragraph.

A wide variety of oxazolidines, which are moisture-activatable to a condition containing a reactive hydrogen atom, can be used in the compositions of the invention, and any monofunctional or polyfunctional oxazolidine will generally be suitable. Generally, the oxazolidines used in the compositions of the invention will have no active hydrogen atoms. By active hydrogen atoms are meant the hydrogen atoms of groups, such as primary and secondary amino, carboxyl, and hydroxyl groups, which readily undergo reaction with electrophilic reagents, such as isocyanates. Compositions comprising oxazolidines having no active hydrogen atoms will generally have greater stability or "pot life" than compositions comprising oxazolidines which have active hydrogen atoms. However, oxazolidines which have active hydrogen atoms and compositions comprising other materials which have active hydrogen atoms can also be advantageously employed to give compositions which have adequate stability or improved curing speed over prior art materials as well as which will provide useful solid polymeric materials. In describing the compositions of the invention, the term "oxazolidine" is used to include both the five-membered ring oxazolidines and the six-membered ring tetrahydro oxazines, and to include compounds having one or more oxazolidine rings. Compounds having more than one oxazolidine ring are generally referred to herein as polyfunctional oxazolidines.

The oxazolidine substituents of the compounds useful in the compositions of the invention generally can be represented by the following formula:

(VI)

wherein
R$^1$ is a hydrogen atom, a phenyl group, a benzyl group, or a (C$_1$–C$_{12}$)alkyl group, and
R$^2$ is a hydrogen atom or a (C$_1$–C$_4$)alkyl group, or
R$^1$ and R$^2$ can be taken together with the attached carbon atom to form a saturated five- or six-membered saturated carbon ring, and
Y is the radical

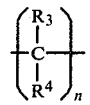

wherein n is 2 or 3, and
R$^3$ and R$^4$ are; individually, hydrogen atoms, (C$_1$–C$_{12}$)alkyl groups, (C$_6$–C$_{10}$)aryl groups, or (C$_1$–C$_{12}$)aralkyl or alkaryl groups.

The groups represented by R$^1$, R$^2$, R$^3$, and R$_4$ can also have inert substituents, such as halogen atoms, alkoxy groups, nitro groups, and the like, and in some embodiments can also have active substituents, such as hydroxyl groups or amino groups.

Five types of oxazolidines are among the preferred oxazolidines for the compositions of the invention—polyfunctional polyol ester oxazolidines, polyfunctional polycarboxylic ester oxazolidines, monofunctional ester oxazolidines, polymers and copolymers of oxazolidinylalkyl acrylates and methacrylates, as well as the simple aliphatic and aromatic mono- and bis-oxazolidines.

Thus, there may be used:

A. The oxazolidines defined in Emmons, U.S. Pat. No. 3,743,626, Column 3, lines 1 to 23, and lines 47 to 61, including the following representatives thereof:
ethylene glycol bis-oxazolidinyl propionate
1,4-butylene glycol bis-oxazolidinyl propionate
ethylene glycol bis-isopropyloxazolidinyl propionate
butylene glycol bis-isopropyloxazolidinyl propionate
trimethylolpropane tri-isopropyloxazolidinyl propionate
lauryl oxazolidinyl propionate
stearyl oxazolidinyl propionate
methyl oxazolidinyl propionate
phenyl oxazolidinyl propionate
pentaerythritol tetra-isopropyloxazolidinyl propionate B. The oxazolidines defined in Emmons U.S. Pat. No. 3,743,626, Column 6, lines 7 to 38, including the following representatives thereof:
bis-oxazolidinylethyl adipate
bis-oxazolidinylethyl phthalate
bis-oxazolidinylethyl terephthalate
bis-oxazolidinylethyl isophthalate
bis-isopropyloxazolidinylethyl adipate
bis-isopropyloxazolidinylethyl phthalate
bis-isopropyloxazolidinylethyl terephthalate
bis-isopropyloxazolidinylethyl isophthalate
the bis-oxazolidinylethyl and bis-isopropyloxazolidinylethyl esters of 1,1,3-trimethyl-5-carboxy-3-(p-carboxyphenyl)indane.

C. The polymers including copolymers of the polymerizable unsaturated compounds defined in B. above, as described in Column 8, lines 11 to 26, of the Emmons U.S. Pat., No. 3,743,626.

D. The monomers and polymers of the oxazolidinylalkyl (meth)acrylate type disclosed in Hankins et al U.S. Pat. No. 3,037,006 and in Column 8, lines 50 to 74 of Emmons U.S. Pat. No. 3,743,626.

E. The oxazolidines defined in the passage of Column 8, line 75 to Column 9, line 35 of Emmons, U.S. Pat. No. 3,743,626, including the following representatives thereof:
1,2-bis-(1,3-oxazolidin-3-yl)ethane
1,8-bis-(1,3-oxazolidin-3-yl)menthane
1,8-bis-(1,3-oxazolidin-3-yl)menthane
bis-4-(3-oxazolidinyl)phenyl methane
bis-(1,3-oxazolidin-3-yl)methane
2-nitro-1,3-bis(1,3-oxazolidin-3-yl)propane and related compounds disclosed in U.S. Pat. No. 3,160,634 of Hodge, granted Dec. 8, 1964,
1,1-bis-(1,3-tetrahydrooxazin-3-yl)methane bis-(1,3-oxazolidin-3-yl)toluene
bis-(1,3-oxazolidin-3-yl)xylene
1,6-bis-(1,3-oxazolidin-3-yl)hexane
1,12-bis-(1,3-oxazolidin-3-yl)dodecane
2,2-4-trimethyl-1,6-bis-(1,3-oxazolidin-3-yl) hexane
3,5,5-trimethyl-1-(1,3-oxazolidin-3-yl)-3-1,3-oxazolidin-3-yl)methyl cyclohexane
1,6-bis-(1,3-oxazolidin-3-yl)hexene-3.

The disclosures of these oxazolidines and their preparation found in Emmons U.S. Pat. No. 3,743,626 from Column 1, line 1 through Column 9, line 64, and in Hankins et al, U.S. Pat. No. 3,037,006 are incorporated herein by reference.

The coatings obtained from the DCP(M)A compositions of the present invention may be clear or colored, as desired, a pigment or filler being included to render the coating translucent or opaque.

In compositions wherein the film-forming material consists primarily of the polyisocyanate (a) and the non-volatile reactive monomer (b) consisting of, or comprising, DCP(M)A, the proportion of reactive monomer, e.g., DCP(M)A, may be in the range of 5% to 95%, preferably between 10 to 60% by weight of the total weight of the two components. When, however, the composition also comprises the active hydrogen-containing component (d), the relative proportions between the several film-forming components may fall in the general ranges, or in the preferred ranges specified in Table I wherein the weight percentages are based on the total weight of film-forming components, (a) an organic polyisocyanate; (d) an organic compound having (i) a plurality of groups containing a reactive hydrogen atom or (ii) a plurality of oxazolidine groups that are moisture-activatable to a condition reactive with the polyisocyanate; and (b) at least one non-volatile reactive monomer selected from the group consisting of DCPA and DCPMA.

TABLE I

| COMPONENT | GENERAL RANGES | PREFERRED RANGES |
|---|---|---|
| (a) | 5% to 95% | 15% to 70% |
| (d) | up to 80% | up to 70% |
| (b) | 5% to 95% | 10% to 60% |

Depending on the particular purpose for which the coatings are intended, the compositions may comprise an opacifying filler or a pigment or dye in a proportion of as low as one-fourth percent by weight to 150% or more by weight, based on the weight of binder in the composition. Examples of such coloring materials include flakes of metal, e.g., steel or aluminum, carbon black, copper oxides, red iron oxide, chrome green, molybdate chrome orange, phthalocyanines, such as copper phthalocyanine, titanium dioxide, lithopone, chrome yellow, ultramarine blue, red cadmium, yellow cadmium, organic toners and lakes, and so on.

As stated previously, the use of DCP(M)A (with or without a minor proportion of another non-volatile reactive monomer) enables the elimination, or substantial reduction in amount of volatile, non-reactive organic solvent used or needed in the coating compositions. The organic solvents of this type that may be used include ketones such as acetone, methyl ethyl ketone and dioxane; hydrocarbons such as xylene, toluene, benzene as well as paraffinic or naphthenic types such as solvent naphthas, esters such as ethyl, propyl, butyl and amyl acetate as well as ethoxyethyl acetate, butoxyethyl acetate and the like, or ethers such as butyl ethyl ether. The solvent may comprise a mixture of several types but in any case, the solvent should be of a type which does not contain an active hydrogen, as determined by the Zerewitinoff method, described in Kohler et al, J. Am. Chem. Soc., 40, 2181–8 (1927), and should also be substantially anhydrous.

Besides the pigments, dyes, or fillers mentioned above, catalysts, antioxidants and antiozonants, stabilizers, flow control agents, or other optional ingredients can also be included in the compositions of the invention.

The compositions of the invention can be used in forming films, paints, lacquers, varnishes, coatings, impregnants, and adhesives for both natural and synthetic materials, such as paper, textiles, wood, plastics, metal, and leather, as binders for non-woven fabrics, and in a wide variety of other uses. To prepare coatings and films, the compositions of the invention can be applied with or without solvent by casting permanently or removably onto a suitable substrate.

Various embodiments of the compositions of the invention and the polymeric materials formed from them exhibit a number of desirable and advantageous properties. Some of the compositions, especially those having only a small content of free NCO groups, can be sealed in a single package so that if moisture is excluded, undesirable thickening or gelling is minimized during storage. Even when those compositions include a siccative, the addition of a volatile oxime in the sealed container can maintain the stability of the compositions. The oxime stabilizer may be used in a small proportion of 0.1% to 2% by weight based on the weight of the non-volatile reactive liquid monomer component. It is generally a volatile ketone-oxime or aldehyde-oxime. Specific examples are methyl ethyl ketone-oxime, methyl butyl ketone-oxime, 5-methyl-3-heptanone-oxime, cyclohexanone-oxime, and butyraldehyde-oxime. Since exposure to atmospheric moisture will effect cure, no additional materials need be mixed with these compositions at the time of use, thus facilitating greatly their handling. Furthermore, when no solvent is incorporated in the compositions, they are extremely high solids coating materials. When some of the compositions are used for the impregnation of leather, they provide significant improvements in break over known urethane systems.

Catalysts that may be added include polyvalent-metal-containing siccatives (or driers). The drier may be any complex or salt containing a polyvalent metal that catalyzes the oxidative curing of drying oils or drying oil-modified alkyd resins. Examples of the driers are various polyvalent metal salts including calcium, copper, zinc, manganese, lead, cobalt, iron and zirconium as the cation. Simple inorganic salts are useful such as the halide, chloride, nitrate, sulfate. However, in circumstances where the vehicle is of organic nature such as those of the present invention, it is frequently preferred to use salts of organic acids such as the acetylacetonate, acetate, propionate, butyrate and the like. The driers may also be complex reaction products of metal oxides, acetates, or borates and vegetable oils. Generally, the most useful driers are salts of naphthenic acids or of ($C_8$–$C_{30}$)aliphatic acids. Examples of the polyvalent metal include calcium, copper, zinc, manganese, lead, cobalt, iron, and zirconium. Examples of the aliphatic or fatty acid component or anion of the drier salt is that of naphthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. Preferred drier salts are those of cobalt and manganese, such as cobalt octoate, cobalt naphthenate and manganese octoate and naphthenate. Mixtures of various driers may be used. The driers mentioned in "Encyclopedia of Chemical Technology," Kirk-Othmer, Volume 5, pages 195-205, published by Interscience Encyclopedia, Inc., N.Y. (1950) may be used.

The proportion of the drier may be quite low and is generally used in the amount of 0.0005 to 2% metal content by weight of the non-volatile reactive liquid monomer component.

The compositions containing the main two components, i.e. the polyisocyanate and the non-volatile reactive liquid monomer components (without the reactive hydrogen atom containing compound or precursor thereof), may be prepared and stored before they are used if certain precautions are taken. Normally such storing should be accomplished in sealed containers where availability of air or oxygen is avoided. However, the two main components mentioned above with whatever other auxiliary components are to be used in the composition (other than the reactive hydrogen atom containing compound or precursor thereof and the drier) may be mixed and stored until the user is ready to employ the coating composition at which time the reactive hydrogen atom containing compound or precursor thereof and a drier is added with or without an inhibitor or stabilizer.

The cured products obtained in the present invention using a drier or siccative involve the incorporation of substantial amounts of oxygen in the final cured products. The drier in conjunction with the presence of oxygen, such as that of the atmosphere, is believed to cause reaction of the drying oil component of the urethane oil with the double bond in the ring of the DCP(M)A and also with its other double bond to co-react the entire body of each of these reactants so that there is no significant residual DCP(M)A that is not covalently bonded in the cured product. However, it is not intended to be limited to this theory of coaction. When other unsaturated moieties are involved in the multiple isocyanate functional group-containing organic compound and/or the reactive hydrogen atom containing compound or precursor thereof when present in the composition, the use of the drier quite effectively cures such components optionally with other components added, and does so while exposed to the atmosphere even at normal room temperature. Acceleration of the cure, of course, can be effected by heating as in a baking step (e.g., 40° C. to 150° C. or higher) in an oven. The time of baking depends upon the particular composition involved and may vary from a few seconds, depending on the thickness of film, to half an hour or more.

The compatibility of the DCP(M)A manifests the desirable characteristic of providing solutions of organic polyisocyanate compound and/or the reactive hydrogen atom containing compound or precursor thereof and the drier as well as any number of a wide variety of other resinous or polymeric materials that may be incorporated into the coating composition. When the use of volatile solvent materials is avoided by using the DCP(M)A as the sole solvent material in the composition, there is obtained in effect a 100% solids coating composition and the curing of that composition avoids the necessity of introducing into the air or into the environment any volatile organic solvent. It also reduces the necessity to provide equipment for recovering any volatilized solvent from the system or equipment in which the curing is effected. p The following examples provide illustrative procedures to make and/or use compositions of the present invention. In these procedures, the parts and percentages are by weight and the temperatures are Centigrade unless otherwise noted.

EXAMPLE 1

High Solids Polyester Polyol/Isocyanate Prepolymer/DCPMA Coating Composition

Coating compositions are prepared by mixing in conventional equipment the following materials (the polyester polyol being predissolved in the methyl ethyl ketone):

| MATERIALS | PARTS BY WEIGHT | |
|---|---|---|
| | A. | B. |
| Isocyanate prepolymer* | 47.0 | 35.0 |
| Polyester polyol** | 53.0 | 40.0 |
| Methyl ethyl ketone | 53.0 | 52.5 |
| DCPMA | — | 25.0 |
| Cobalt naphthenate (6% Co) | — | 0.5 |
| Reactive solids content (%) | 65.4 | 65.4 |
| Viscosity (Centistokes, 25° C.) | 85 | 35 |
| Gel Time | less than 2 days | 1-2 hours |

*A 100% solids aliphatic polyisocyanate having an equivalent weight of 195. It is a high molecular weight biuret of 1,6-hexamethylene diisocyanate available as L-2291 from Mobay (essentially a lower viscosity version of Desmodur N).
**A 100% solids hydroxyl functional polyester having an equivalent weight of 225, a hydroxyl number of about 250 and an acid number of less than 4. Available commercially as Desmophen 650 (Mobay Chemical Co.).

Steel panels are coated with the respective freshly-prepared compositions to provide films of 1.5 mils when dry, allowed to cure at ambient conditions for two weeks, and on testing, the films show the following properties:

| | Coating A | Coating B |
|---|---|---|
| Tack Free Time | ca. 24 hrs. | ca. 24 hrs. |
| Tukon Hardness (KHN) | 15.4 | 14.1 |
| Pencil Hardness | 2H | H-2H |
| Reverse Impact (in-lb.) | 20 | 120 |
| Water Resistance (140° F./24 hrs.) | V. Good | Ex. |
| Wet Adhesion (crosshatch %) | 100 | 100 |

EXAMPLE 2

High Solids Acrylic Polyol/Isocyanate Prepolymer/DCPMA Coating Compositions

Coating compositions are prepared by mixing the following:

| MATERIALS | PARTS BY WEIGHT | |
|---|---|---|
| | A. | B. |
| Isocyanate prepolymer of Ex. 1 | 25.0 | 18.8 |
| Acrylic polyol (60%)* | 125.0 | 93.8 |
| n-Butyl acetate | 50.0 | 37.7 |
| DCPMA | — | 25.0 |
| Cobalt naphthenate (6% Co) | — | 0.25 |
| Total | 200.0 | 175.6 |
| Reactive Solids Content (%) | 50.0 | 57.0% |

-continued

| MATERIALS | PARTS BY WEIGHT | |
|---|---|---|
| | A. | B. |
| Viscosity (Centistokes, 25° C.) | 190 | 130 |
| Gel Time | 2 days | 1 day |

*A 60% solids solution in Cellosolve acetate/toluene, wt. ratio 65/35 of a copolymer of 41.6 parts methyl methacrylate, 19.8 parts of n-butyl methacrylate, 19.8 parts styrene, 17.8 parts β-hydroxyethyl acrylate, and 1 part acrylic acid, the solution having a viscosity at 25° C. of about 60 poises.

Steel panels are coated with the respective freshly-prepared compositions to provide films of 1.5 mils when dry, allowed to cure at ambient conditions for two weeks, and on testing, the films show the following properties:

| | Coating C | Coating D |
|---|---|---|
| Tack Free Time | about 10 hrs. | about 24 hrs. |
| Tukon Hardness (KHN) | 12.0 | 7.8 |
| Pencil Hardness | H-2H | H |
| Reverse Impact (in-lb.) | 4 | 8 |
| Water Resistance (140° F./24 hrs.) | Exc. | Exc. |
| Wet Adhesion (crosshatch %) | 100 | 100 |

EXAMPLES 3-7

Coating compositions are prepared by mixing the following:

| Materials | Parts by Weight | | | | |
|---|---|---|---|---|---|
| | 3 | 4 | 5 | 6 | 7 |
| Isocyanate prepolymer of Ex. 1 | 24.0 | 21.0 | 18.0 | 16.0 | 13.0 |
| Acrylic polyol of Ex. 2 (60%) | 126.7 | 106.7 | 95.0 | 81.7 | 61.7 |
| n-Butyl acetate | 49.3 | 45.2 | 36.6 | 33.2 | 17.4 |
| DCPMA | — | 15.0 | 25.0 | 35.0 | 50.0 |
| Cobalt naphthenate (6% Co) | — | 0.8 | 0.8 | 0.8 | 0.8 |
| Total | 200.0 | 188.7 | 175.4 | 16.7 | 142.9 |
| Reactive Solids Content | 50.0 | 53.0 | 57.0 | 60.0 | 70.0 |
| Viscosity (Centistokes, 25° C.) | 172 | 150 | 155 | 111 | 119 |
| Gel Time | 2 days | 3 hrs. | 80 min | 80 min | 80 min |

Steel panels are coated with the respective freshly-prepared compositions to provide 1.5 mils when dry and allowed to cure at ambient conditions for two weeks. On testing, the films show the following properties:

| | Coating | | | | |
|---|---|---|---|---|---|
| | 3 | 4 | 5 | 6 | 7 |
| Tack Free Time | 10 hrs | 3½ hrs | 10 hrs | 26 hrs | 35 hrs |
| Tukon Hardness (KHN) | 12.4 | 9.7 | 12.5 | 13.4 | 16.5 |
| Pencil Hardness | 2H | 2H | 2H | 2H | 2H |
| Impact (in-lb) | | | | | |
| Reverse | 2-4 | 60 | 10 | 2 | 2 |
| Direct | 30 | 100 | 30 | 20 | 10 |
| Wet Adhesion (crosshatch %) | 100 | 100 | 100 | 100 | 100 |
| Water Resistance (140° F./24 hr) | Exc. | Exc. | Exc. | Exc. | V. Good |

EXAMPLES 8-10

Coating compositions are prepared by mixing the following:

| Materials | Parts by Weight | | |
|---|---|---|---|
| | 8 | 9 | 10 |
| Isocyanate prepolymer of Ex. 1 | 24.0 | 16.0 | 16.0 |
| Acrylic polyol of Ex. 2 (60%) | 126.7 | 81.7 | 81.7 |
| n-Butyl acetate | 49.3 | 33.2 | 33.2 |
| DCPMA | — | 35.0 | 25.0 |
| Isodecyl methacrylate | — | — | 10.0 |
| Cobalt naphthenate (6% Co) | — | 0.8 | 0.8 |
| Total | 200.0 | 166.7 | 166.7 |
| Reactive Solids Content | 50.0 | 60.0 | 60.0 |
| Viscosity (Centistokes, 25° C.) | 222 | 123 | 117 |
| Gel Time | 2 days | 1¾ hours | 1½ hours |

Steel panels are coated with the respective freshly-prepared compositions to provide 1.5 mils when dry and allowed to cure at ambient conditions for two weeks. On testing, the films show the following properties:

| | Coating | | |
|---|---|---|---|
| | 8 | 9 | 10 |
| Tack Free Time | 10 hrs | 24 hrs | 24 hrs |
| Tukon Hardness (KHN) | 12.8 | 12.5 | 9.9 |
| Pencil Hardness | 2H | 2H | 2H |
| Impact (in-lb) | | | |
| Reverse | 4 | 2 | 2 |
| Direct | 40 | 10 | 20 |
| Wet Adhesion (crosshatch %) | 100 | 100 | 100 |
| Water Resistance (140° F./24 hrs) | Good | Exc. | Good |

EXAMPLES 11-12

High Solids, Caprolactone Polyol/Isocyanate Prepolymer/DCPMA Coating Composition Coating compositions are prepared by mixing:

| Materials | Parts by Weight | |
|---|---|---|
| | 11 | 12 |
| Isocyanate Prepolymer* (75%) | 77.3 | 58.0 |
| Caprolactone Triol** (100%) | 42.0 | 31.5 |
| n-Butyl acetate | 23.6 | 10.1 |
| DCPMA | — | 25.0 |
| Cobalt naphthenate (6% Co) | — | 0.4 |
| Total | 142.9 | 125.0 |
| Reactive Solids (%) | 70.0 | 80.0 |
| Viscosity (Centistokes, 25° C.) | 117 | 160 |
| Gel Time (hours) | 36 | 4 |

*An aromatic polyisocyanate adduct of tolylene diisocyanate and trimethylolpropane; NCO equivalent weight is 325 at 75 percent solids in ethyl acetate (Mondur$^R$ CB-75, Mobay Chemical Company)
**An ε-caprolactone triol of average molecular weight 540 and a hydroxyl number of 310 (Niax$^R$ PCP-0300, Union Carbide Corporation)

Steel panels are coated with the respective freshly-prepared compositions to provide films of 2.0 mils when dry and allowed to cure at ambient conditions for two weeks. On testing, films show the following properties:

| | Coating | |
|---|---|---|
| | 11 | 12 |
| Tack Free Time | about 12 hrs | about 12 hrs |

-continued

|  | Coating | |
| --- | --- | --- |
|  | 11 | 12 |
| Tukon Hardness (KHN) | 12.7 | 11.3 |
| Pencil Hardness | F | H-2H |
| Reverse Impact (in-lb) | 80 | 120 |
| Water Resistance (140° F./24 hrs) | Exc. | Exc. |
| Adhesion (crosshatch %) |  |  |
| Wet | 0 | 18 |
| Dry | 13 | 100 |

EXAMPLE 13

High Solids oxazolidine Resin/Isocyanate prepolymer/DCPMA Coating Composition

Coating compositions are prepared by mixing:

|  | Parts by Weight | |
| --- | --- | --- |
| Materials | E | F |
| Isocyanate prepolymer of Ex. 1 | 44.0 | 33.0 |
| OXEMA copolymer (85%)* | 65.9 | 49.4 |
| Cellosolve acetate | 15.1 | 7.0 |
| DCPMA | — | 25.0 |
| Cobalt naphthenate (6% Co) | — | 0.5 |
| Total | 125.0 | 114.9 |
| Reactive Solids (%) | 80.0 | 87.0 |
| Viscosity (Centistokes, 25° C.) | 445 | 270 |
| Gel Time | Greater than 10 days | 6–10 days |

*A low molecular weight oligomeric copolymer of 65 weight % of n-butyl methacrylate and 35 weight % of oxazolidinylethyl methacrylate (OXEMA) having a viscosity of 100 poises at 85% concentration in Cellosolve acetate. Equivalent weight is 270 based on solids content.

Steel panels are coated with the respective freshly-prepared compositions to provide films of 2 mils when dry, allowed to cure at ambient conditions for two weeks, and on testing, the films show the following properties:

|  | Coating | |
| --- | --- | --- |
|  | E | F |
| Tack Free Time | about 3 hrs | about 1.3 hrs |
| Tukon Hardness (KHN) | 7.6 | 3.0 |
| Pencil Hardness | H | F |
| Reverse Impact (in-lb) | 40 | 100 |
| Water Resistance (140° F./24 hr.) | Exc. | Exc. |
| Wet Adhesion (crosshatch %) | 95 | 100 |

EXAMPLE 14

Example 13 is repeated except that DCPA is used instead of DCPMA as the reactive diluent with comparable results.

EXAMPLE 15

Pigmented High Solids Acrylic Polyol/Isocyanate Prepolymer/DCPMA Coating Composition A TiO$_2$-pigmented urethane coating is prepared as follows, using the acrylic polyol and isocyanate prepolymer of Example 2.

|  | Parts |
| --- | --- |
| Acrylic Polyol (60%) of Ex. 2 | 100 |
| n-Butyl acetate | 100 |
| Rutile TiO$_2$ | 200 |
| ASCO Graded sand, 20–30 mesh | 400 |

The above mixture is ground on a sand mill at 2360 FPM for 20 minutes and then passed through an extra fine varnish filter to remove the sand.

The resulting pigment dispersion (65% solids) is used in preparing a coating composition by mixing the following:

| Formulation of the Enamel | Parts |
| --- | --- |
| Filtered pigment dispersion (65%) | 66.7 |
| Acrylic polyol (60%) of Ex. 2 | 59.1 |
| Isocyanate prepolymer of Ex. 2 | 14.0 |
| DCPMA | 19.4 |
| Ethyl acetate | 4.7 |
| n-Butyl acetate | 30.0 |
| Cobalt naphthenate (6% CO) | 0.64 |
| Total | 194.54 |
| Total Solids (%) | 57.3 |
| Viscosity (#4 Ford Cup) | 21.5 sec. |
| Gel Time | Less Than 1 Day |

The resulting enamel is applied by spraying on a steel panel to form a 1.5 mil dry thickness. A tack-free time of about 12 hours is observed. After 5 days cure under ambient conditions, a pencil hardness of HB and a specular gloss of 85 at 20° are observed.

EXAMPLE 16

β-hydroxyethyl methacrylate (HEMA), DCPMA and the isocyanate prepolymer used in Example 1 are mixed in the proportions of 32/25/43 parts by weight respectively. 0.25 gram of cobalt naphthenate (6% Co) is then added to the mixture. The mixture is of essentially 100% reactive content and has a viscosity of 70 centistokes. A 1.5 mil film cast on a steel test panel has a set time of two days and a tack-free time of about 8 days at ambient. Tukon hardness at that time is 1.2 and reverse impact strength is 120 in-lb.

EXAMPLE 17

Example 16 is repeated replacing the HEMA with oxazolidinylethyl methacrylate (OXEMA) in the proportions by weight: OXEMA/DCPMA/isocyanate prepolymer =24/25/51. The mixture has a viscosity of 78 centistokes. Set time is about two days and tack-free time is 9 days. The film has a Tukon hardness of 0.5 and reverse impact strength of 120 in-lb.

EXAMPLES 18–20

High Solids, One-Package Uralkyd/DCPMA Coating Composition Coating

Compositions are prepared by mixing:

|  | Parts by Weight | | |
| --- | --- | --- | --- |
| Materials | 18 | 19 | 20 |
| Uralkyd* (60%) | 166.7 | 125.0 | 83.3 |
| DCPMA | — | 25.0 | 50.0 |
| Cobalt naphthenate (6% Co) | 1.0 | 1.0 | 1.0 |
| Methyl ethyl ketone oxime | 0.25 | 0.25 | 0.25 |
| Reactive Solids Content | 59.5 | 66.1 | 74.5 |

-continued

| Materials | Parts by Weight | | |
|---|---|---|---|
| | 18 | 19 | 20 |
| Viscosity (Gardner-Holdt, 25° C.) | V | H+ | A-B |

*A one-package stable oil-modified urethane, ASTM type-1, containing no free isocyanate groups; no free residue of toluene diisocyanate available under the trademark Spenkel F 77-60X 60% solids in xylene Gardner-Hodlt viscosity-S; clear intended for use in clear or pigmented paints and varnishes.

Steel panels are coated with the compositions to yield films of 2 mils when dry. After curing for three weeks at ambient, the films are tested and show the following properties:

| | Coating | | |
|---|---|---|---|
| | 18 | 19 | 20 |
| Tack Free Time | 2¾ hrs | 4¼ hrs | 6½ hrs |
| Tukon Hardness (KHN) | 7.8 | 12.3 | 17.1 |
| Pencil Hardness | HB | F | F |
| Impact (in-lb) | | | |
| Direct | 140 | 20 | 4 |
| Reverse | 120 | 2 | 2 |

What is claimed is:

1. A composition having a film-forming binder comprising:
   (a) a member selected from the group consisting of an organic polyisocyanate, a urethane oil, and a uralkyd;
   (b) at least one non-volatile reactive liquid monomer selected from the group consisting of dicyclopentenyl acrylate and dicyclopentenyl methacrylate; and
   (c) an effective amount of a polyvalent metalcontaining complex or salt that catalyzes the curing of (a) and (b),
   compound (b) being 5 to 95% by weight of the binder.

2. A composition according to claim 1 wherein component (a) is a polyisocyanate comprising an isocyanate-terminated prepolymer.

3. A composition according to claim 1 wherein component (a) is a urethane oil, wherein the urethane oil is an isocyanate-modified drying oil.

4. A composition according to claim 1 wherein component (a) is a uralkyd, wherein the uralkyd is an isocyanate-modified alkyd resin.

5. A composition according to claim 1 having a film-forming binder further comprising:
   (d) a member selected from the group consisting of (i) an organic compound having a plurality of groups containing a reactive hydrogen atom and (ii) an organic compound having plurality of oxazolidine groups that are moisture-activatable to a condition containing a reactive hydrogen atom.

6. A composition according to claim 1 wherein component (b) is 10 to 60% by weight of the binder.

7. A composition according to claim 5 wherein the proportions of binder components (a), (d), and (b) are from about 5% to 95% by weight, up to 80% by weight, and 5% to 95% by weight respectively of the several components based on total binder weight.

8. A composition according to claim 5 in which the proportions of binder components (a), (d), and (b) are from about 15% to 70%, up to 70%, and 10% to 60% by weight respectively of the several components based on total binder weight.

9. A composition according to claim 7 wherein component (d) is a hydroxy-terminated polyester or polyether.

10. A composition according to claim 7 wherein component (d) is a vinyl addition polymer having hydroxyl groups in polymerized units thereof.

11. A composition according to claim 7 wherein component (d) is a compound containing a plurality of oxazolidine groups.

12. A composition according to claim 7 wherein component (d) is a polymer of oxazolidinylalkyl (meth)acrylate.

* * * * *